(12) United States Patent
Woerner

(10) Patent No.: US 6,669,213 B2
(45) Date of Patent: Dec. 30, 2003

(54) INDUSTRIAL TRANSPORTATION AND STORAGE CART

(75) Inventor: Axel G. Woerner, Nagold (DE)

(73) Assignee: Hafele America Co., Archdale, NC (US)

(*) Notice: Subject to any disclaimer, the term of this patent is extended or adjusted under 35 U.S.C. 154(b) by 0 days.

(21) Appl. No.: 09/919,520

(22) Filed: Jul. 31, 2001

(65) Prior Publication Data

US 2003/0030239 A1 Feb. 13, 2003

(51) Int. Cl.[7] ................................................. B62B 3/02
(52) U.S. Cl. ................................... 280/47.35; 280/79.3
(58) Field of Search ......................... 280/47.34, 47.35, 280/79.11, 79.2, 79.3, 79.7, 35; 211/182, 189, 191, 206; 248/127, 129; 403/169, 176, 217, 383

(56) References Cited

U.S. PATENT DOCUMENTS

| | | |
|---|---|---|
| 656,275 A | 8/1900 | Streeter |
| 2,345,650 A | 4/1944 | Attwood .................. 189/36 |
| 2,571,337 A | 10/1951 | Burnham .................. 61/48 |
| 2,774,609 A * | 12/1956 | Winger .................. 280/79.11 |
| 3,042,221 A | 7/1962 | Rasmussen ............... 211/148 |
| 3,130,439 A * | 4/1964 | Bovaird .................. 211/182 |
| 3,186,561 A | 6/1965 | Strassle .................. 211/182 |
| 3,204,779 A * | 9/1965 | Warner .................. 211/182 |
| 3,292,323 A | 12/1966 | Hagan .................. 52/127 |
| 3,462,021 A | 8/1969 | Hawke et al. ............ 211/182 |
| 3,513,606 A | 5/1970 | Jones .................. 52/27 |
| 3,606,024 A | 9/1971 | Mieville .................. 211/176 |
| 3,840,124 A | 10/1974 | Atwater .................. 211/182 |
| 3,877,579 A | 4/1975 | Weider .................. 211/176 |
| 4,261,470 A | 4/1981 | Dolan .................. 211/191 |
| 4,427,379 A * | 1/1984 | Duran et al. ............ 280/79.3 |
| 4,545,490 A | 10/1985 | Hsiao et al. ............ 211/191 |
| 4,579,229 A | 4/1986 | Porcaro et al. ............ 211/13 |
| 4,778,064 A * | 10/1988 | Gold .................. 211/182 |
| 5,016,765 A | 5/1991 | Leonardo ............... 211/189 |
| 5,169,009 A * | 12/1992 | Bomze .................. 211/189 |
| 5,257,794 A * | 11/1993 | Nakamura ............... 280/79.3 |
| 5,299,699 A * | 4/1994 | Cole .................. 211/187 |
| 5,535,898 A * | 7/1996 | Burgess, Sr. et al. ....... 211/289 |
| 5,785,293 A * | 7/1998 | Ford et al. .................. 280/35 |
| 5,901,523 A | 5/1999 | Tasi .................. 52/653.2 |
| 5,915,803 A | 6/1999 | Daugherty et al. ......... 312/263 |
| 5,931,320 A * | 8/1999 | Gajda et al. ............ 211/189 |
| 5,961,243 A | 10/1999 | Michaluk, III ............ 403/260 |
| 6,044,990 A * | 4/2000 | Palmeri .................. 211/189 |
| 6,315,136 B1 * | 11/2001 | Baldoni et al. ............ 211/189 |

* cited by examiner

*Primary Examiner*—Frank Vanaman
(74) *Attorney, Agent, or Firm*—Womble Carlyle Sandridge & Rice, PLLC

(57) ABSTRACT

A portable storage and transportation cart that is easy to assemble, disassemble, and reassemble, and a kit for constructing same. The cart includes a plurality of elongated hollow frame members having substantially uniform outer profiles and at least one series of incrementally spaced transverse holes along their length. The frame members may have various lengths. The cart also may include a plurality of three-way couplings, a plurality of unions, a plurality of cylindrical shelf tubes, a plurality of casters, and a plurality of wheel adapters. The various components of the cart or a portion thereof are configured and suited for non-permanent assembly together in a variety of combinations and configurations to form various portable utility and transportation carts.

25 Claims, 12 Drawing Sheets

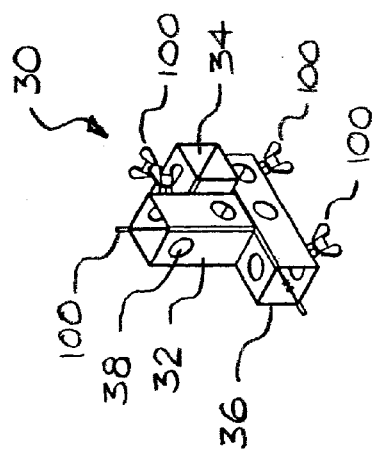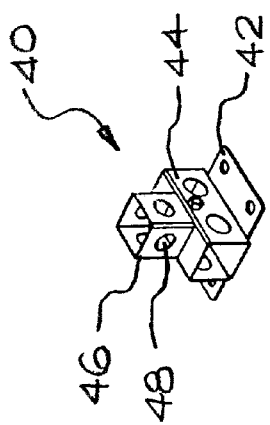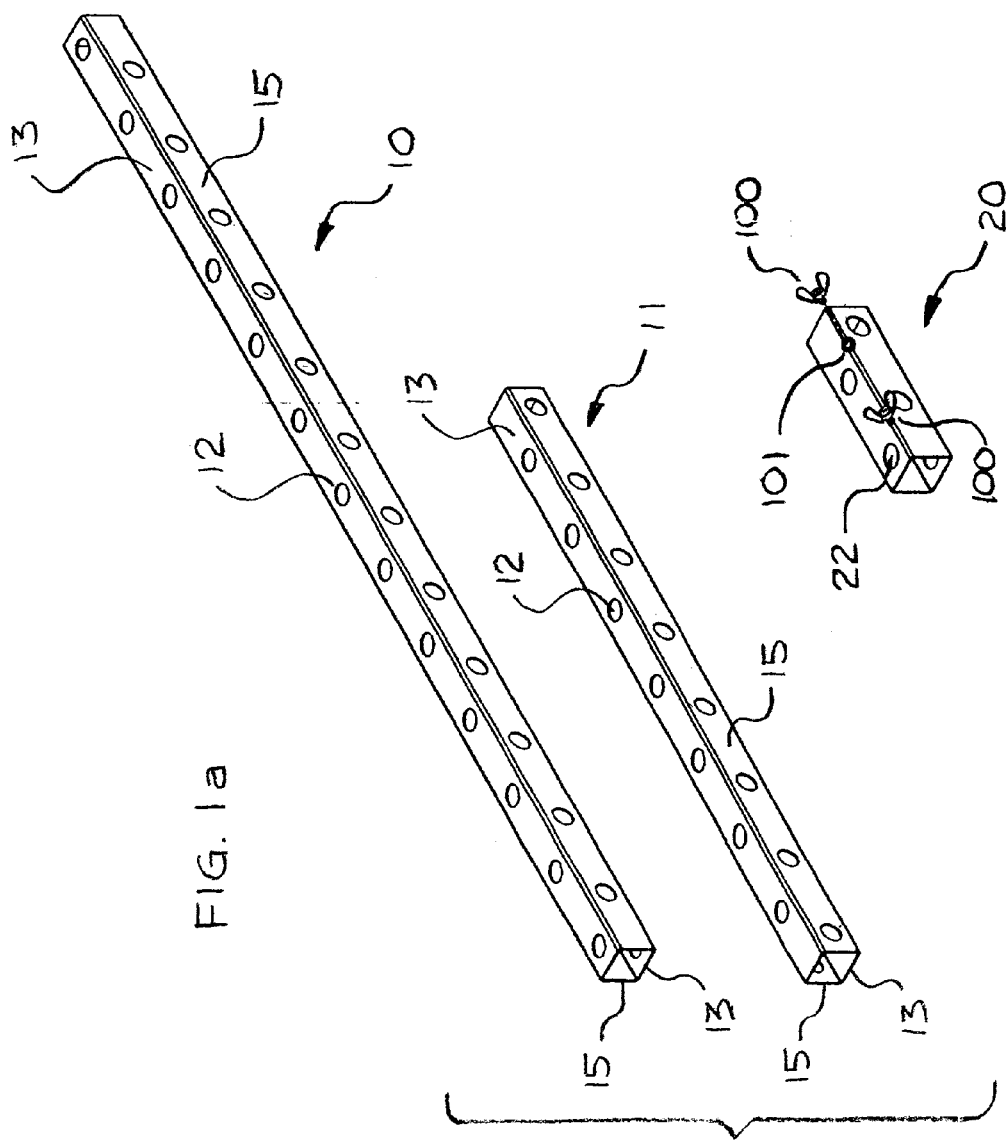

INDUSTRIAL TRANSPORTATION AND STORAGE CART

FIELD OF THE INVENTION

The invention relates generally to industrial storage and transportation carts, and more specifically to an easy-to-assemble kit suited for non-permanent assembly into a variety of combinations to form various portable storage and transportation carts.

BACKGROUND

Many manufacturers, distributors, retailers, businesses and other entities must store or transport articles as part of their operations. Such articles may include raw materials, components, supplies, work-in-process, finished goods, and packages or the like. When these articles are sufficiently small or light-weight, they may be stored or transported on portable carts which are designed to be moved manually, usually by a single person. Such carts typically include casters and/or wheels to facilitate easy movement across floors, platforms, ramps or the like. Dollies are a common form of such carts. Dollies typically include a horizontal platform or frame supported on wheels and/or casters, and often include a handle for grabbing, pushing, and steering the dollies.

Certain operations, however, require more specialized carts. For example, glass plates and other fragile, substantially planar objects or the like often cannot be safely stacked atop each other, and are typically transported or stored on carts having vertical uprights to support and space the articles in a vertical orientation. When panels and the like are freshly painted or chemically coated, they are often placed on carts that support the wet objects so that the objects don't impermissibly contact one another or their supporting means. These panels may be transported, stored, and/or dried on carts having a series of horizontal bars or shelf tubes that define horizontal support planes on the cart. Other articles or objects may be best stored or transported on carts that have one or more shelves for supporting the articles.

Though carts such as conventional dollies are readily commercially available, specialized carts for particular applications may be more difficult to come by. Even if a suitable cart is commercially available, its cost may be high. If a required cart must be specially manufactured for a particular application, its cost may be even more prohibitive.

Therefore, there is a need for an affordable storage/transportation cart that is flexible in design, easily portable, strong and durable, and that can be adapted to suit a wide variety of applications. Similarly, there is a need for an easy-to-assemble kit for storage/transportation carts that can be assembled into a wide variety of cart sizes and configurations for a multitude of applications. Also, there is a need for a storage/transportation cart that can be quickly and easily reconfigured to adapt the cart to suit an instant application.

SUMMARY OF THE INVENTION

The present invention meets these needs by providing a kit for constructing a variety of easy-to-assemble portable storage and transportation carts. The kit includes a plurality of elongated hollow frame members having substantially uniform outer profiles. Each frame member includes a first and a second end, sidewalls, and at least one series of incrementally spaced pairs of aligned holes through opposite walls of the frame member along the length thereof. Each pair of aligned holes have a common axis which is perpendicular to the sidewalls and preferably passes through the longitudinal centerline of the frame member. The frame members in a kit may have the same length, or two or more lengths of frame members may be included. The kit also includes a plurality of three-way couplings for connecting two or three frame members together at right angles to each other. In addition, the kit may include a plurality of unions for connecting the ends of two frame members together end-to-end. A plurality of cylindrical shelf tubes is also provided. The shelf tubes have outer diameters slightly smaller than the diameters of the incrementally spaced holes in the sidewalls of the frame members such that the shelf tubes can be fittingly engaged in the holes in the sidewalls of the frame members. The kit further includes a plurality of casters and a plurality of wheel adapters configured for mounting the casters to the frame members. The frame members, three-way couplings, unions, shelf tubes, casters, and wheel adapters or a portion thereof are configured and suited for nonpermanent assembly together in a variety of combinations and configurations to form various portable utility and transportation carts.

Preferably, the hollow frame members have substantially uniform square cross-sections and include first and second pairs of opposing sidewalls, where all four sidewalls include incrementally spaced holes. The holes in each pair of opposing sidewalls are longitudinally aligned with each other, and the longitudinal positions of the holes in one pair of opposing sidewalls can be staggered from the longitudinal positions of the holes in the other pair of opposing sidewalls. In this arrangement, the three-way couplings, unions, and wheel adapters are configured for mating assembly with the square profile of the frame members. In a preferred embodiment, each three-way coupling, union, and wheel adapter includes a series of holes which are suitably located and spaced for matching alignment with the incrementally spaced holes in the sidewalls of the frame members during assembly. These matching holes may be used to pin, bolt, or similarly affix a coupling, union, or wheel adapter to a frame member or to each other. In addition, each three-way coupling and union may include at least one transverse set screw for setting a frame member or other kit component that is respectively engaged in the coupling or union.

In a preferred embodiment, each three-way coupling includes a hollow vertical socket for receiving an end of a first frame member, a hollow channel for receiving a second frame member; and a hollow lateral socket for receiving the end of a third frame member. The vertical socket, the lateral socket, and the channel are attached to each other and have longitudinal axes which are perpendicular to each other. The sockets have substantially identical internal profiles that are compatible with outer profiles of the frame members and are suitable for mating engagement over the outer profiles of the frame members.

The unions are for the purpose of connecting two frame members in end-to-end relationship. For this purpose, each union includes a hollow body having a first end for mating engagement over an end of a first frame member, and a second end for mating engagement over an end of a second frame member. The unions have cross-sectional profiles of such shape and size to provide close, fitting engagements with the walls of the frame members.

The wheel adapters preferably include a horizontal channel which receives a horizontal frame member. A vertical socket is provided, over which a vertical frame member or three-way coupling may be mounted. The horizontal channel and vertical socket are attached to each other and to a plate that may be attached to the mounting plate on a caster.

The invention is also directed to storage/transportation carts constructed from the kit described hereinabove. The frame members, three-way couplings, unions, shelf tubes, casters and wheel adapters or a portion thereof are assembled together to form a variety of configurations of storage and transportation carts.

For example, one such series of storage/transportation carts includes pairs of the shelf tubes assembled in a cantilevered array on the cart such that each pair of shelf tubes delineates a substantially horizontal support plane for supporting a substantially planar object. This cart may also include a plurality of protective sleeves movably mounted on the cantilevered shelf tubes. The sleeves provide adjustable support points or cushions on the shelf tubes for supporting substantially planar objects at discrete points on the shelf tubes.

In one embodiment of this series, a base is formed of a pair of foot rails and a cross rail formed of frame members connected together by a pair of three-way couplings, four casters, and four wheel adapters. The cross rail has a first end connected to one foot rail by one three-way coupling and a second end connected to the other foot rail by the second three-way coupling such that the two foot rails are parallel to each other and the cross rail is perpendicular to each foot rail. The casters are mounted on the base at the ends of the foot rails by the wheel adapters. This embodiment further includes a pair of opposed vertical stanchions, each vertical stanchion comprising a first frame member and having a top end and a bottom end. Each vertical stanchion is mounted to the base by one of the three-way couplings connecting the cross rail to the foot rails. A cross beam includes a horizontal frame member having a left end, and a right end, and a second pair of three-way couplings. Each end of the cross beam is connected to a vertical stanchion at its top end by a three-way coupling. A plurality of pairs of shelf tubes are arranged in a cantilevered array on the vertical stanchions. The shelf tubes are engaged in the holes of the frame members comprising the vertical stanchions such that each shelf tube is substantially parallel to the foot rails and each pair of shelf tubes delineates a substantially horizontal support plane for supporting a substantially planar object. The shelf tubes may be cantilevered from one side of the vertical stanchions. In this arrangement, a pair of stanchion braces may be provided. Each stanchion brace includes a frame member connected at one end to a vertical stanchion and at a second end to a foot rail that is connected to the stanchion, such that each stanchion and associated brace form an acute angle.

In an alternative arrangement, the shelf tubes may extend through the holes in the frame members comprising the vertical stanchions so that the shelf tubes extend outwardly from both sides of the vertical stanchions. First portions of the shelf tubes are cantilevered from a front side of the vertical stanchions and second portions of the shelf tubes are cantilevered from a back side of the vertical stanchions, thereby forming a front cantilevered array and a back cantilevered array of substantially horizontal support planes. The vertical stanchions may further include a second frame member connected end-to-end with the first frame member by a union to make the cart taller.

Another series of carts constructed from a kit as described above includes pairs of the shelf tubes arranged vertically on a cart base such that each pair of shelf tubes delineates a substantially vertical support plane for supporting substantially planar objects. Such a cart may include a rectangular base comprised of four frame members joined at their ends by four three-way couplings to form corners. A vertical post may be mounted at each corner to the three-way coupling, which in turn is mounted on the vertical socket of the wheel adapter. In this series, the cart base further includes a plurality of shelf tubes disposed between two opposing frame members of the base. The shelf tubes are spaced and arranged to form a horizontal support surface. Pairs of additional shelf tubes are vertically supported on the base to form a plurality of supports for storing panels or the like in a vertical plane. The vertical shelf tubes are supported in the holes in the sidewalls of the frame members forming the base. Casters are mounted on the bottom of the base at each corner by a wheel adapter. The cart may further include a platform supported on the first plurality of shelf tubes. The cart may additionally include a third vertically mounted shelf tube between each pair of vertical shelf tubes to provide an additional central vertical support.

Another series of carts constructed from the above kit includes at least one horizontal shelf. In this embodiment, a rectangular base is formed as described above with frame members extending upwardly from each corner. One or more pairs of shelf tubes are assembled between the upstanding corner frame members such that each pair of shelf tubes is spaced and vertically aligned for supporting a shelf in a horizontal position. At least one shelf is supported on and between a pair of shelf tubes.

Yet another type of cart or dolly is formed from a rectangular base with casters as described above. The dolly may include a plurality of shelf tubes disposed in the holes in the sidewalls of two opposing frame members which form the base and extending between the opposing frame members. These shelf tubes form a horizontal support surface on the dolly. The dolly may also include two opposed pairs of vertical corner posts, each corner post comprising a frame member having a top end and a lower end, the lower end being connected to a corner of the base by the three-way coupling. Two handle bars may be provided which include a shelf tube horizontally disposed between the top ends of each pair of corner posts.

These and other aspects of the present invention as disclosed herein will become apparent to those skilled in the art after a reading of the following description of the preferred embodiments when considered with the drawings.

BRIEF DESCRIPTION OF THE DRAWINGS

FIGS. 1(a)–1(j) illustrate embodiments of components included in a kit for constructing storage and transportation carts according to the present invention;

DETAILED DESCRIPTION OF THE PREFERRED EMBODIMENTS

Figure 1H:
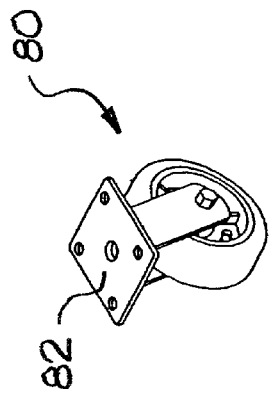

FIGS. 1(a)–1(j) illustrate preferred embodiments of components of a kit for constructing a plurality of carts according to the present invention. FIG. 1(a) illustrates a preferred embodiment of frame members 10 and 11 which are the primary structural elements for constructing a frame for a desired cart. The frame members are preferably constructed of steel. The frame members 10, 11 can be provided in one or more desired lengths suitable for constructing a variety of carts. In the preferred embodiments shown in FIGS. 1–10, two lengths of frame members are included. A preferred length for a long frame member 10 is about 1250 millimeters. A preferred length for a short frame member 11 is about 750 mm. Preferably, the frame members 10 and 11 are hollow and have side walls 13, 15 that are thin compared to the width of the frame members to provide an optimal strength to weight ratio. In a most preferred embodiment, the hollow frame members 10, 11 have a uniform, square cross-section and are about 45 mm wide. Alternatively, other suitable hollow shapes may also be used for the frame members 10 and 11. For example, the frame members may be cylindrical or may have a rectangular or other polygonal cross-section. The side walls 13, 15 of the frame members 10, 11 preferably include a plurality of incrementally spaced pairs of aligned holes 12 along their lengths. Preferably, axes of each pair of aligned holes 12 pass through the longitudinal centerline of the frame members at right angles to the sidewalls 13, 15. Each pair of holes 12 in opposing sidewalls 13 or 15 are aligned to allow a cylindrically-shaped object such as a tube, dowel, or bolt to transversely pass through a frame member through a pair of aligned holes. To provide universal compatibility between mating components, the holes 12 have a uniform diameter and are preferably equally longitudinally spaced from each other. As shown in FIG. 1(a), the pattern of holes 12 in one pair of opposing sidewalls 13 may be longitudinally staggered from the locations of holes 12 in the other pair of opposing sidewalls 15. This allows the same number of holes to provide twice as many spacing arrangements.

Figure 1J:
Figure 1I:
Figure 1G:
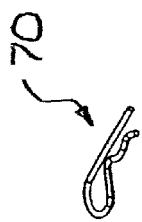
Figure 11:
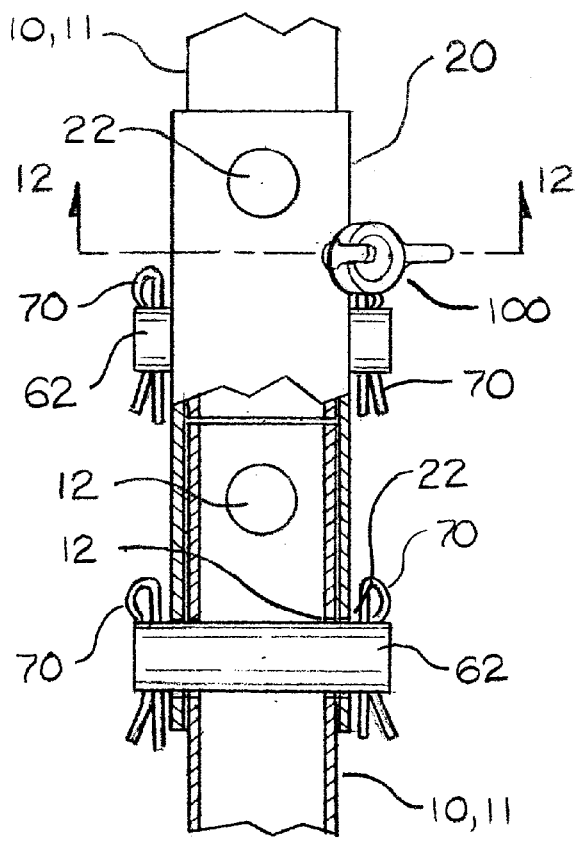
FIG. 11 is a detail view shown in partial section showing details of the connection between two frame members joined end-to-end by a union.
Figure 12:
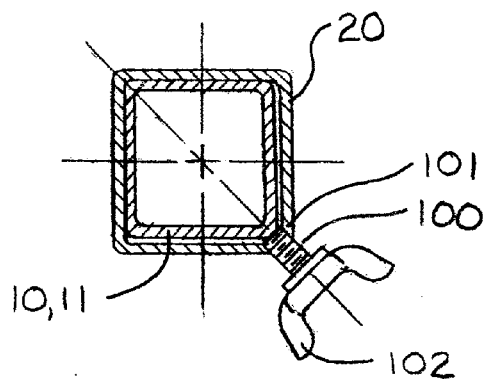
FIG. 12 is a section view taken along the line 12—12 shown in FIG. 11 showing details of a transverse set screw fixing a frame member inside a union.

Another component included in a preferred embodiment of a kit according to the present invention is a plurality of unions 20 like that shown in FIG. 1(b). The unions 20 are provided to connect two frame members 10, 11 together end-to-end as shown in FIG. 11. As shown in FIG. 1(b), the union 20 is preferably hollow, and has a cross-sectional shape that is compatible with the cross-sectional shape of the frame members 10, 11. The union 20 is preferably constructed of steel. In a preferred embodiment, the Unions 20 have a square cross-section with an inner dimension that is slightly wider than the outer dimension of the frame members 10 and 11 so that an end of a frame member 10, 11 can be inserted into the union 20 as seen in FIG. 11. Preferably, the clearance between a union 20 and an inserted frame member 10, 11 is large enough to permit the parts to freely slide together or apart, but small enough to provide fitting alignment and engagement between the mating parts. When the frame members have other non-square cross-sectional shapes, the union 20 should be compatibly shaped for mating engagement with the frame members. In order to fasten the ends of two connecting frame members 10 or 11 inside a union 20, the union 20 is provided with two transverse set screws 100 in mating threaded holes 101 along a side or corner of the union 20. A preferred embodiment of the set screws 100 is shown in FIG. 1(j) and includes wings 102 that allow the screws 100 to be tightened or loosened by hand. As best seen in FIGS. 11 and 12, adjoining ends of two frame members can be engaged in the union 20 and the set screws 100 advanced to clamp the ends inside the union 20. The set screws 100 affix the frame members 10 or 11 in the union 20. Where the connection must bear significant loads, the connection can be completed with stronger, load-bearing fasteners such as the connector tubes 62 or by bolts, pins, dowels or the like. For example, holes 22 are provided in the walls of the union 20 for use in connecting the union 20 to the frame members 10, 11. The holes 22 are sized and spaced to match the holes 12 in the frame members 10, 11. In the preferred embodiment shown in FIG. 11, connector tubes 62 are used to connect the frame members 10, 11 to the joining adapter 20. Locking pins 70 pass through cross holes in the connector tubes to lock the connector tubes 62 in place.

Also included in a preferred embodiment of a kit is a plurality of three-way couplings 30 as shown in FIG. 1(c). The three-way couplings 30 attach two or three frame members 10, 11 together at right angles to each other. In the preferred embodiment shown in FIG. 1, the coupling 30 is constructed of steel and includes three receptacles connected to each other: 1) a hollow vertical socket 32 for mating engagement over an end of a one frame member 10, 11; 2) a hollow channel 36 for fitting engagement over a second frame member; and 3) a hollow lateral socket 34 for mating engagement with a third frame member. The vertical socket 32, the lateral socket 34, and the channel 36 have longitudinal axes which are perpendicular to each other and have substantially identical internal profiles. In the preferred arrangement, the vertical socket 32, channel 36, and lateral socket 34 each have a square cross-section for receiving frame members 10, 11 that have compatible square outer profiles. The term "slightly larger" means that the three receptacles 32, 34, 36 are sized to slide over the frame members while providing close, mating engagement with the frame members. When the frame members have a cross-sectional shape that is not square, the three receptacles 32, 34, 36 should have a compatible cross-sectional shape. Each receptacle 32, 34, 36 may include one or more transverse set screws 100 for fixing a frame member 10, 11 in the receptacle. Such a connection is similar to that illustrated in FIG. 12 for the union/frame member connection. Holes 38 are provided in the walls of the receptacles 32, 34, 36 for use in connecting the coupling 30 to the frame members 10, 11. The holes 38 are sized and spaced to match the holes 12 in the frame members 10, 11. In the preferred embodiment, connector tubes 62 can be used to connect the frame members 10, 11 inside the receptacles of a joining coupling 30. Locking pins 70 extend through cross holes in the ends of the connector tubes to lock the connector tubes 62 in place. Such a connection is similar to that illustrated in FIG. 12 for the union/frame member connection discussed above.

As seen in FIG. 1(h), a preferred embodiment of a kit also includes a plurality of casters 80. The casters 80 are swivelly attached to a steel mounting plate 82 for use in mounting the casters on a cart. A plurality of wheel adapters 40 like that shown in FIG. 1(d) are included for connecting a caster 80 to a frame member 10, 11. Each wheel adapter is preferably constructed of steel and includes an adapter plate 42, a lateral receiver 44, and a vertical socket 46 connected together. The adapter plate 42 includes a pattern of bolt holes matching a corresponding bolt hole pattern in the mounting plate 82 of a caster 80 for use in bolting a caster 80 and a wheel adapter 40 together. Preferably, the lateral receiver 44 has a square cross-section for receiving frame members 10, 11 that have compatible square outer profiles. The lateral receivers 44 are sized to slide over the frame members while providing close, mating engagement with the frame members. When the frame members have a cross sectional shape that is not square, the lateral receiver 44 should have a compatible cross-sectional shape. The vertical socket 46 protrudes above the wheel adapter 40 and has the same size and cross-sectional profile as the frame members 10 and 11. Accordingly, the vertical socket 46 can be engaged in the receptacle portions of other kit components (primarily the three-way coupling) described herein that are sized and shaped to receive a frame member. The walls of the lateral receiver 44 and vertical post 46 may include holes 48 for use in connecting the wheel adapter to the frame members 10, 11, the three-way coupling 30, or other kit components as required. The holes 48 are sized and spaced to match the holes 12 in the frame members 10, 11 and similar holes provided in other mating kit components.

Figure 1E:
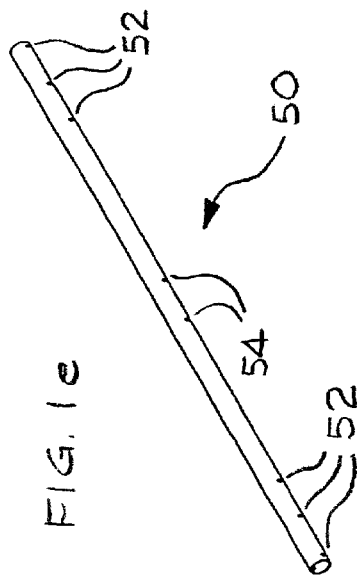

A preferred embodiment of a kit also includes a plurality of cylindrical shelf tubes 50 like that shown in FIG. 1(e). The shelf tubes 50 have a uniform outer diameter that is slightly smaller than the diameter of the holes 12 in the frame tubes 10 and 11, the holes 22 in the unions 20, the holes 38 in the three-way couplings 30, and the holes 48 in the wheel adapters 40. Accordingly, the shelf tubes can pass through and be supportingly engaged in the holes 12, 22, 38, or 48 or any aligned combination thereof. As seen in FIG. 1(e), the shelf tubes preferably include a series of small diameter cross holes 52 and 54. The holes 52 and 54 are provided to receive locking pins 70 or the like to lock a shelf tube into the holes 12, 22, 38, or 48 of a kit component. The pin holes 54 are a pair spaced apart a distance slightly greater than the width of frame member, so that by placing the frame member between the holes, pins 70 can be inserted into the holes 54 to lock the shelf tube in place. Likewise, the three cross holes 52 at the ends are similarly placed to lock the shelf tube around one, or perhaps two frame members. In a preferred embodiment, the shelf tubes 50 are about 740 mm long.

Figure 1F:
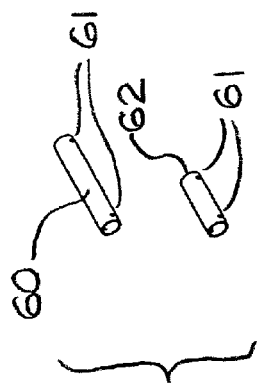
Figure 13:
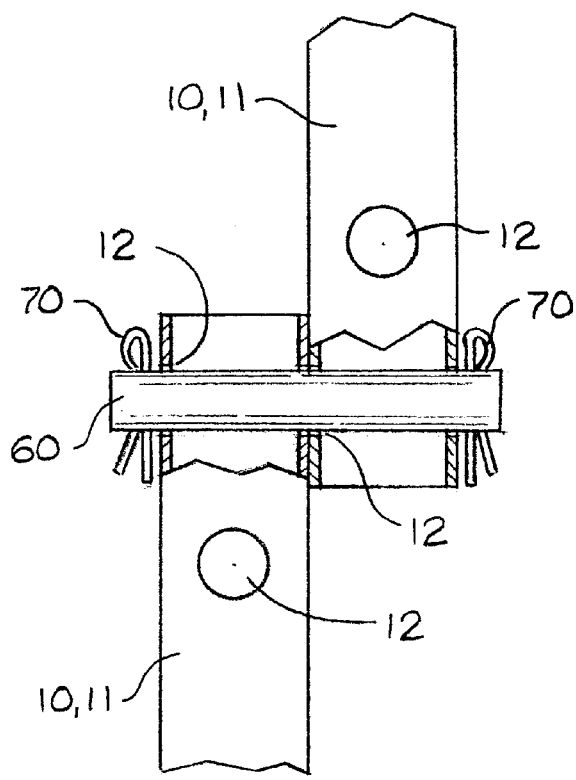
FIG. 13 is a detail view shown in partial section showing details of a connection between two frame members joined side-by-side.

A preferred embodiment of a kit according to the present invention includes hardware for connecting the kit components described above together in desired arrangements. As mentioned above, the holes 12 in frame members 10, 11; the holes 22 in union 20; the holes 38 in three-way coupling 30; and the holes 48 in wheel adapter 40 can be used to connect the kit components. Preferably, cylindrical connector tubes 60 and 62 as shown in FIG. 1(f) are used to join components where the transverse set screws 100 may not provide an adequately strong connection. A longer connector tube 60 is provided for joining two components that adjoin side by side. For example, as shown in FIG. 13, a long connector tube 60 may be used to connect one frame member 10, 11 to the side of another frame member 10, 11. A connector tube 60 is passed through the holes 12, 22, 38, and/or 48 in the adjoining components. The long connector tubes 60 include small-diameter cross holes 61 near their ends for receiving locking pins 70 or the like for locking the connector tubes into the adjoining components. Shorter connector tubes 62 are provided for affixing two components together that are matingly engaged in a male/female fashion. For example, as shown in FIG. 11, a short connector tube 62 may be used to connect a frame tube 10, 11 to a union 20 in which the frame member is inserted. The connector tube 62 is passed through aligned holes 12, 22, 38, and/or 48 in the mated components. The connector tubes 62 include small-diameter cross holes 61 near their ends for receiving locking pins 70 or the like for locking the connector tubes into the holes of mated components. The connector tubes 60 and 62 have uniform outer diameters that are slightly smaller than the diameters of the holes 12, 22, 38, and 48.

FIGS. 2–10 illustrate various carts that can be constructed from the kit described above. As can be seen in these illustrations, a wide variety of cart configurations can be produced from a single kit. The various carts shown in FIGS. 2–10 are shown merely as illustrative examples, however, and are not intended to limit the makeup of the kit or the number of possible cart combinations that can be produced from the kit.

Figure 2:
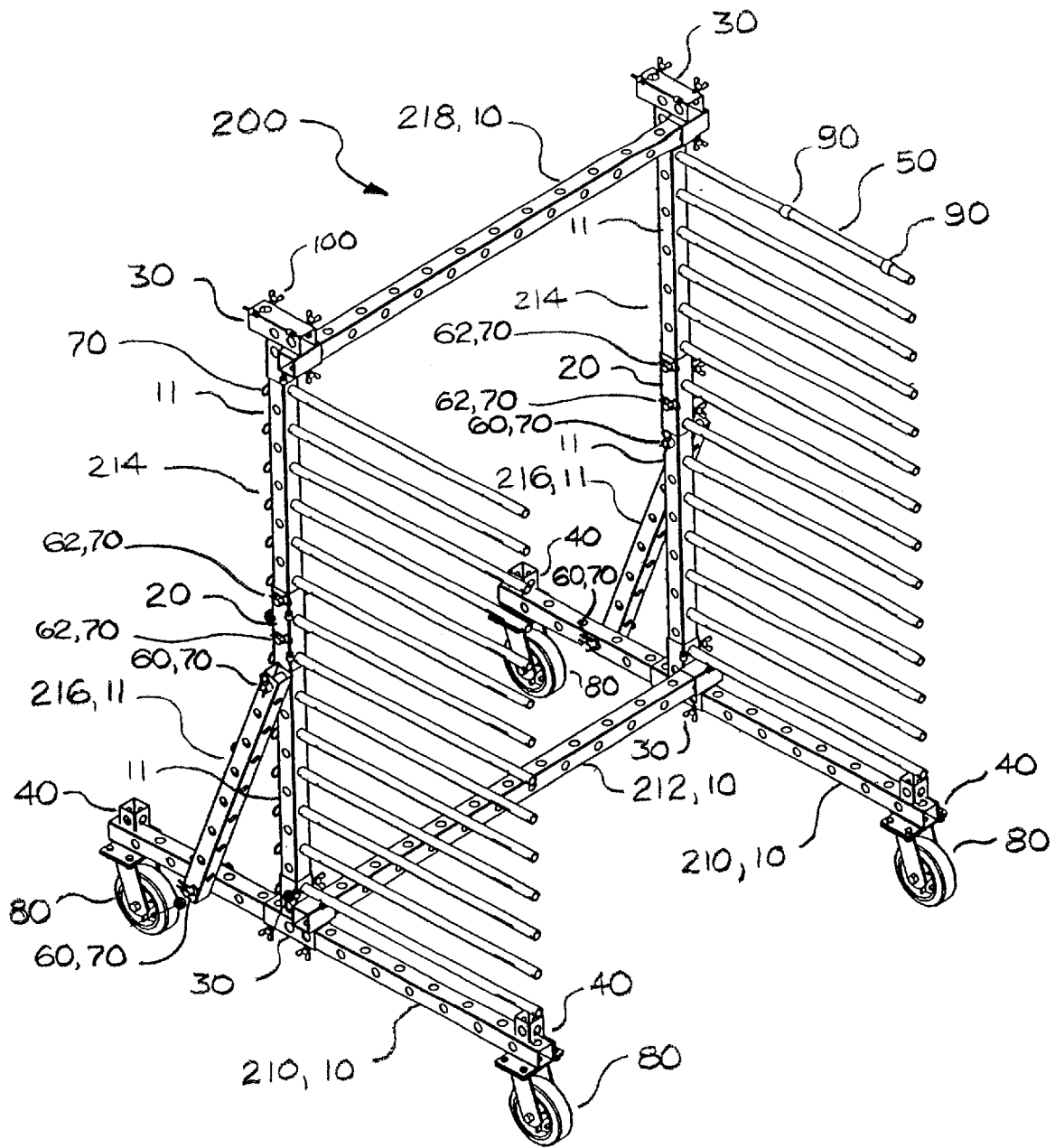
FIG. 2 is a perspective view of one embodiment of a cart for horizontally supporting planar objects that is assembled from a kit including the components shown in FIGS. 1(a)–1(j)
Figure 3:
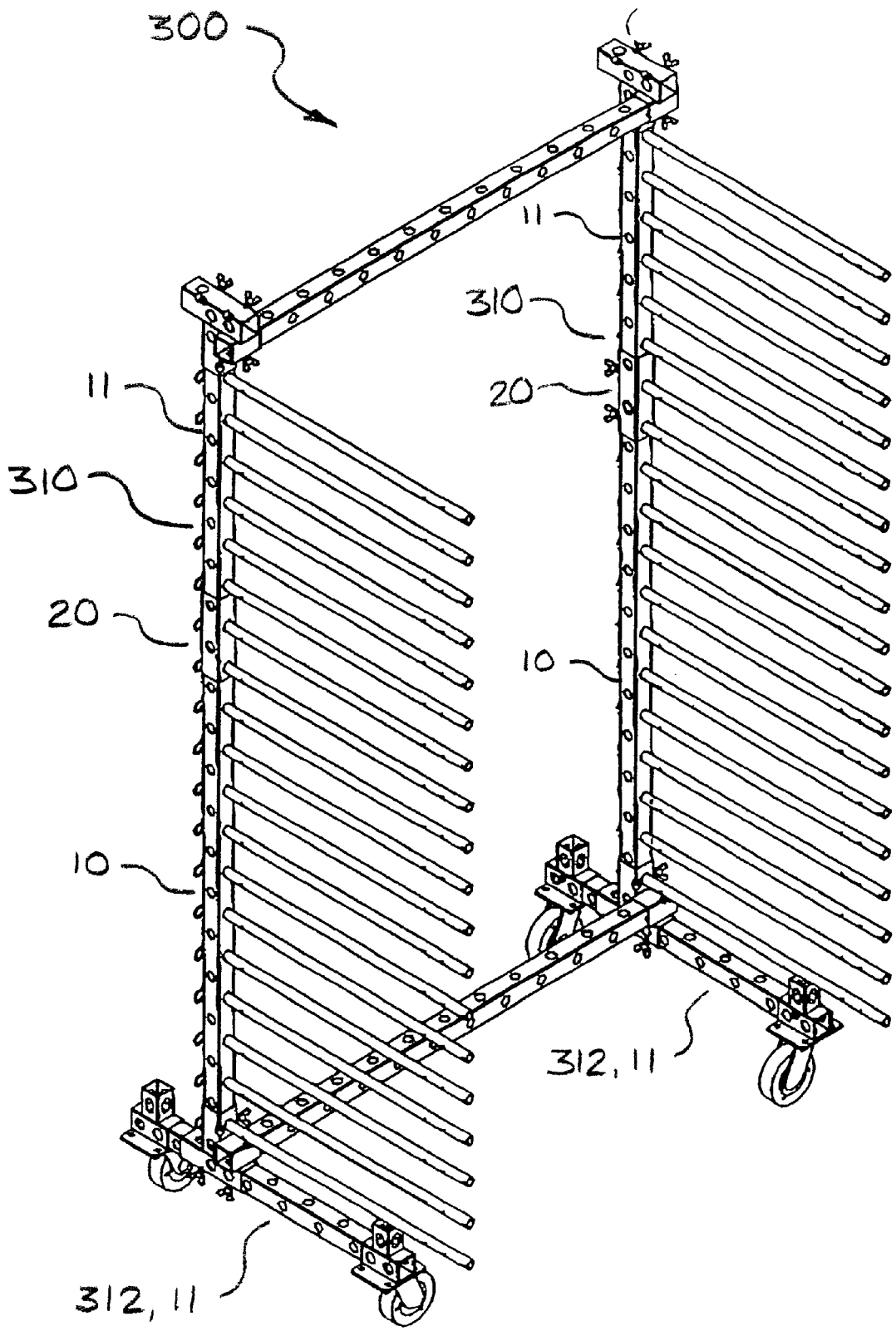
FIG. 3 is a perspective view of a second embodiment of a cart for horizontally supporting planar objects that is assembled from a kit including the components shown in FIGS. 1(a)–1(j)
Figure 4:
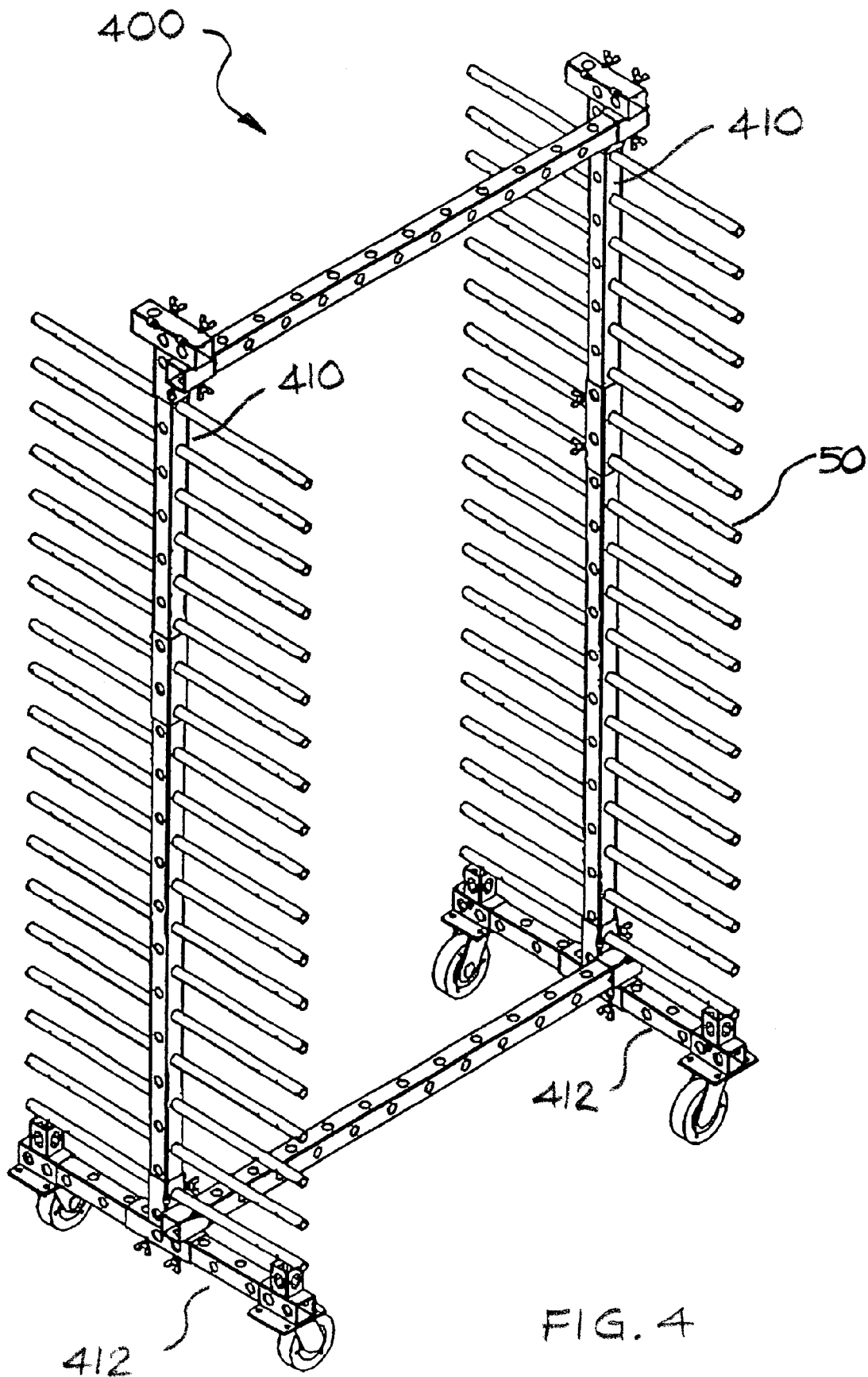
FIG. 4 is a perspective view of a third embodiment of a cart for horizontally supporting planar objects that is assembled from a kit including the components shown in FIGS. 1(a)–1(j)

FIGS. 2–4 show carts having pairs of shelf tubes 50 arranged in horizontal arrays for supporting a pluralities of substantially planar objects on the shelf tubes. The cart 200 illustrated in FIG. 2 is used below to explain the typical construction of a cart built from the kit components described above. First, a base includes two foot rails 210 and a cross rail 212, each comprising a long frame member 10. The cross rail 212 is connected to the foot rails 210 near their mid-lengths. Each end of the cross rail 212 is connected to a foot rail by a three-way coupling 30. The foot rails 210 pass through the channels 36 of the couplings 30, and the ends of the cross rail 212 are engaged in the lateral sockets 34 of the couplings 30. The foot rails 210 and cross rail are affixed in the couplings 30 by set screws 100. Casters 80 are mounted on the ends of the foot rails 210 with wheel adapters 40. Two vertical stanchions 214 are mounted on the base. Each stanchion 214 comprises two short frame members 11 connected end-to-end by a union 20. The lower end of each stanchion 214 is engaged in the vertical socket 32 of a three-way coupling 30 that connects a foot rail 210 to a cross rail 212. A set screw 100 sets each stanchion in its mating vertical socket 32. A short connector tube 62 passes through aligned holes between the stanchion 214 and the vertical socket 32 of the coupling 30. The connector tubes 62 are locked in place by locking pins 70. To reinforce each stanchion 214 on the base, a brace 216 comprising a short frame member 11 is connected at an acute angle between each stanchion and its adjoining foot rail 210. Each brace is connected to its stanchion 214 and the adjoining foot rail 210 by a long connector tube 60 that is inserted into aligned holes 12 in the adjoining frame members 11 and is locked in place by locking pins 70. A detail view of such a connection is shown in FIG. 13. A cross beam 218 comprising a long frame member 10 connects upper ends of the vertical stanchions 214. Two three-way couplings 30 connect the ends of the cross beam 218 to the stanchions 214. The top ends of the vertical stanchions 214 are engaged in the vertical sockets 32 of the couplings 30. The ends of the cross rail 88 are engaged in the lateral sockets 34 of the couplings 30. The vertical stanchions 214 and cross beam 218 are affixed in the couplings 30 by set screws 100. Finally, a plurality of shelf tubes 50 are cantilevered from a forward side of the stanchions 214. Ends of the shelf tubes are engaged in the holes 12 and 22 in the stanchions as shown. The shelf tubes are passed through the stanchions sufficiently to permit locking pins 70 to be installed in the cross holes 52 in the shelf tubes 50 to lock the shelf tubes in place. Also shown in FIG. 2 are shelf tube sleeves 90 engaged on a shelf tube 50. These sleeves 90 can be slipped onto the shelf tubes 50 to provide discrete support points or cushions for articles supported on the shelf tubes. As best seen in FIG. 1(*i*), the sleeves 90 are plastic cylinders or rings having a longitudinal slit 23 to aid in placement or removal of the sleeves 90 onto/from the shelf tubes 50.

The cart 300 shown in FIG. 3 is similar to the cart described above, but is made taller and not as deep by a few simple modifications to the cart 200 of FIG. 2. The height difference is accomplished by constructing each of the stanchions 310 from a long frame member 10 joined end-to-end with a short frame member 11. The cart 300 shown in FIG. 3 is less deep because short frame members 11 are used for the foot rails 312 in lieu of long frame members. Another similar cart configuration 400 is accomplished by a slight variation to the cart 300 of FIG. 3 as shown in FIG. 4. In this arrangement, the stanchions 410 are mounted to the foot rails 412 near their centers. Also, the shelf tubes 50 are inserted halfway through the holes in the stanchions 410 so that the shelf tubes 50 are cantilevered from both forward and rearward sides of the stanchions 410. This arrangement provides horizontal supports on either side of the stanchions 410.

Figure 5:
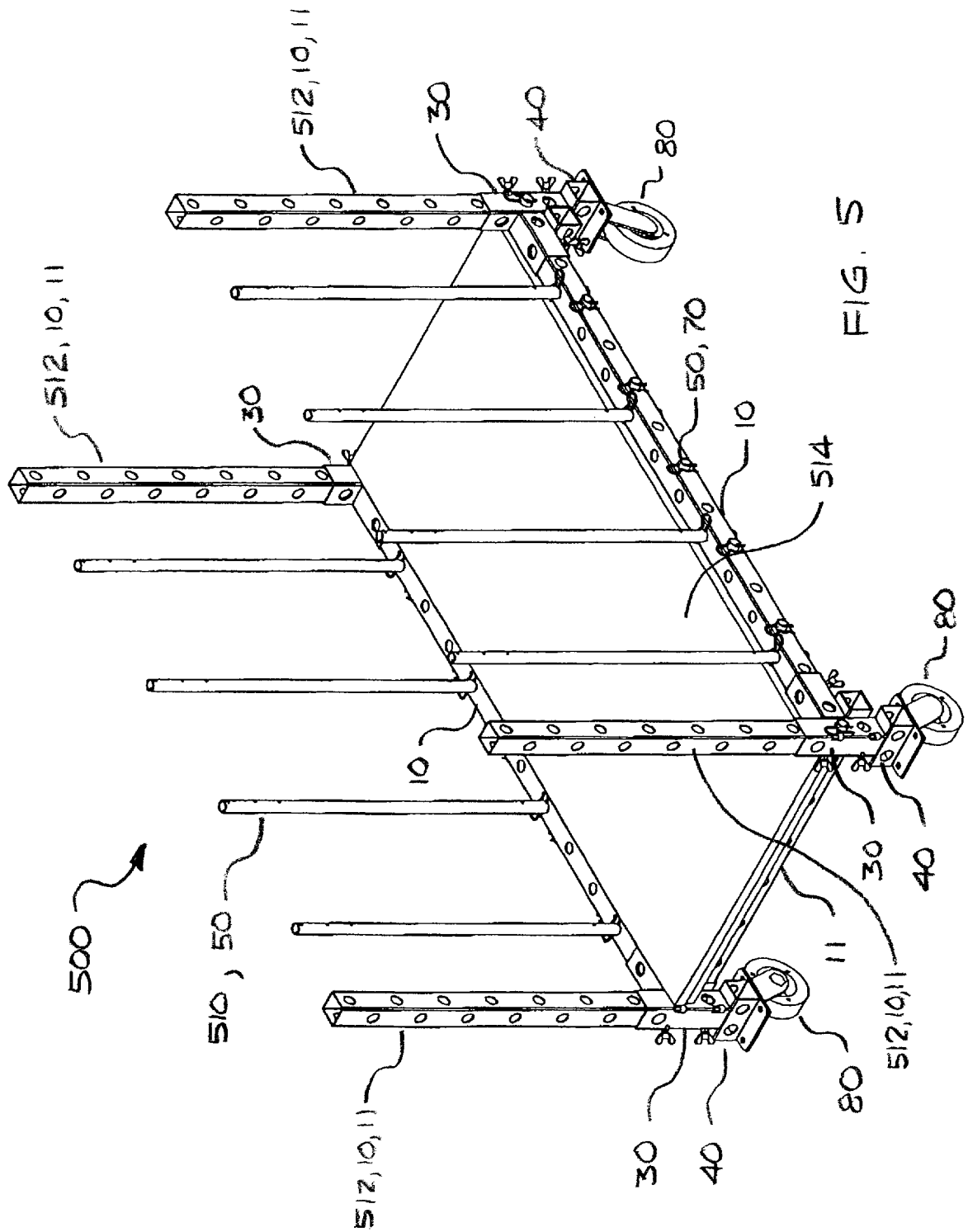
FIG. 5 is a perspective view of an embodiment of a cart for vertically supporting planar objects that is assembled from a kit including the components shown in FIGS. 1(a)–1(j)
Figure 6:
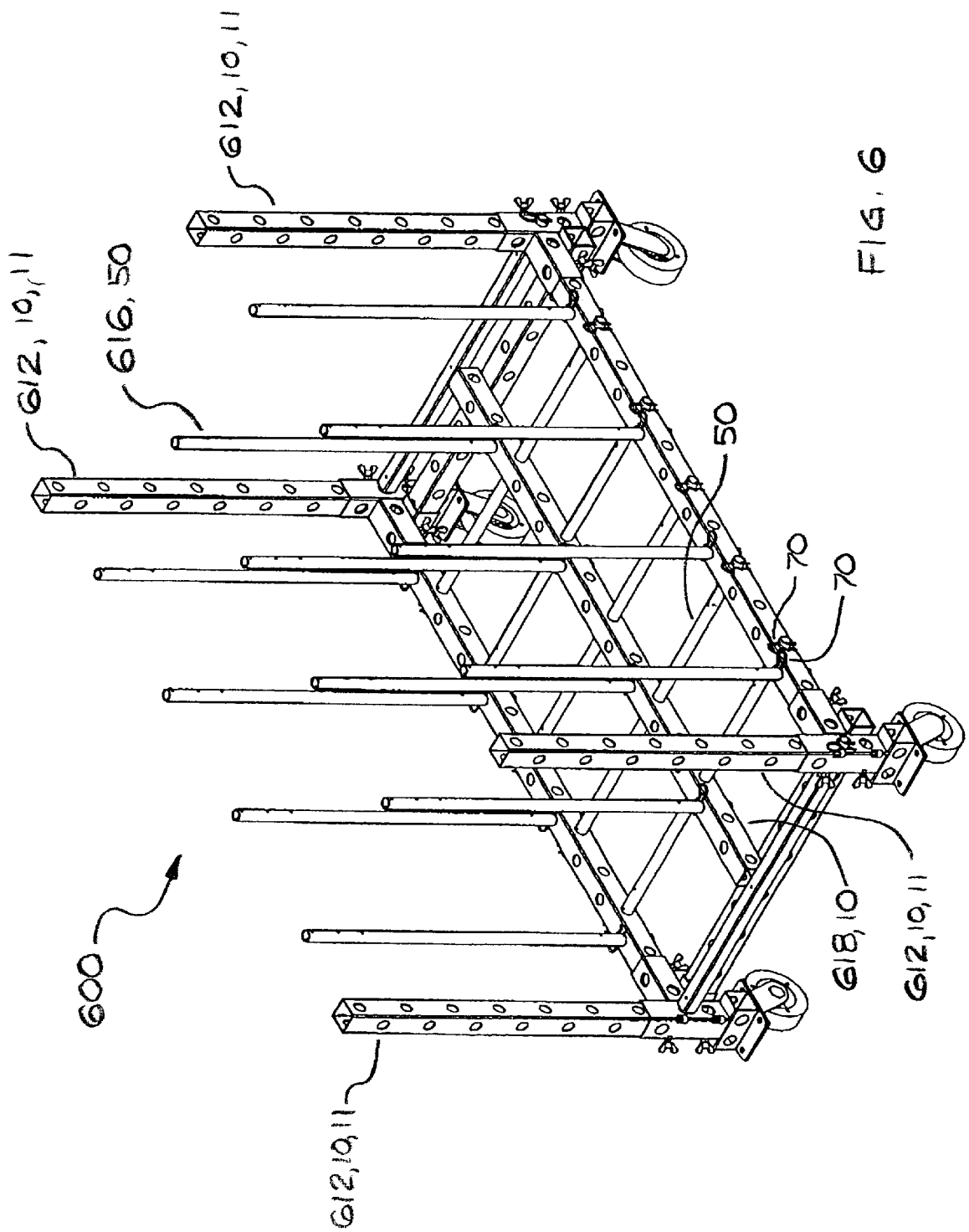
FIG. 6 is a perspective view of a second embodiment of a cart for vertically supporting planar objects that is assembled from a kit including the components shown in FIGS. 1(a)–1(j)
Figure 7:
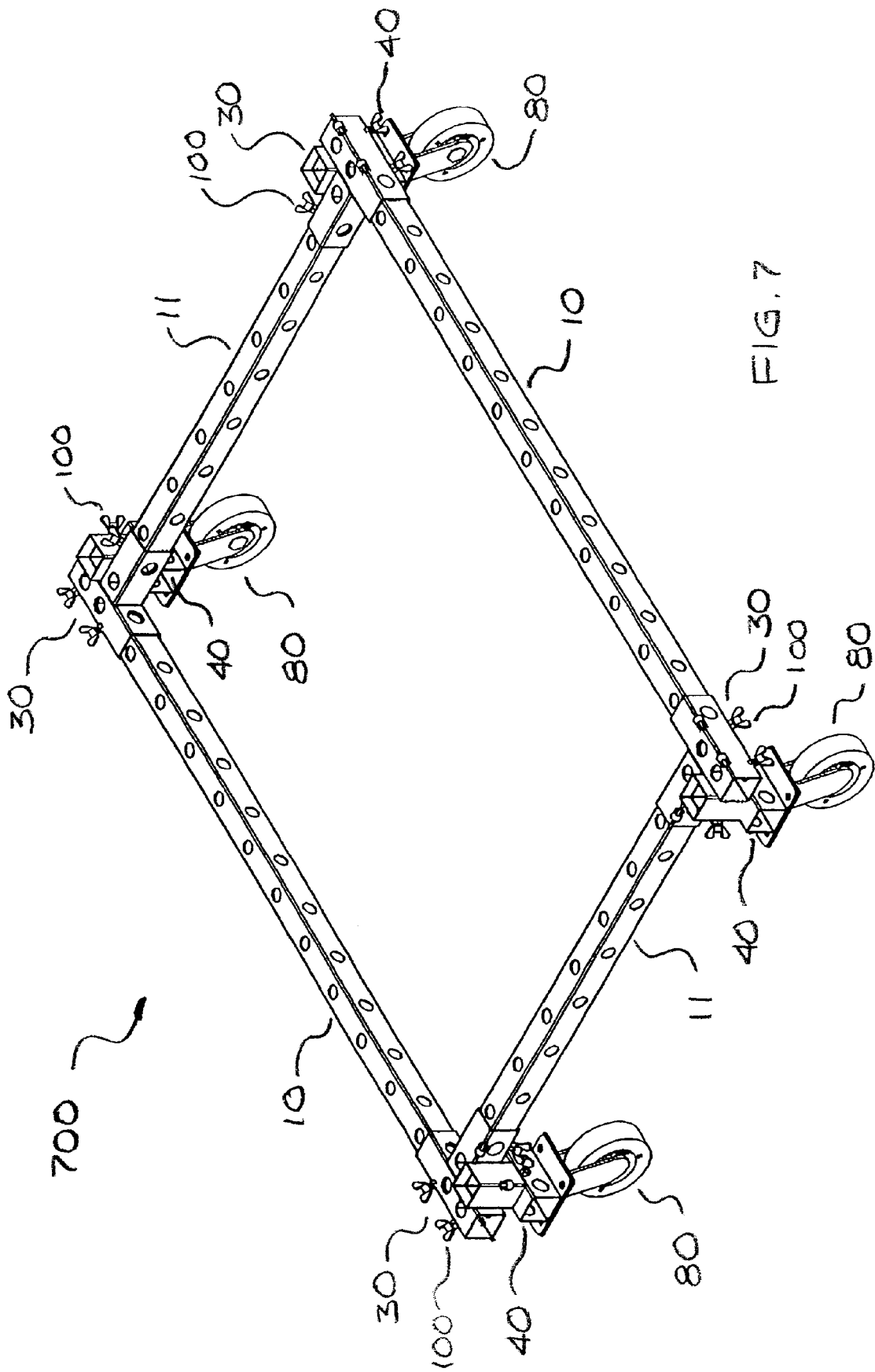
FIG. 7 is a perspective view of an embodiment of a dolly that is assembled from a kit including the components shown in FIGS. 1(a)–1(j)

Other types of carts can also be constructed from the kit as shown in FIGS. 5–10. A simple dolly 700 is shown in FIG. 7. A rectangular frame is constructed of two long frame members 10 and two short frame members 11 connected as shown by four three-way couplings 30. Casters 80 are mounted to the bottom of this frame at each corner by wheel adapters 40 connected to the couplings 30. The frame members 10, 11, the couplings 30, and the wheel adapters 40 are affixed together by tightening transverse set screws 100 on the couplings 30. This construction requires no connector tubes 60 or 62. The cart 700 can be used for moving large objects such as furniture, cabinets, crates, or the like.

Figure 8:
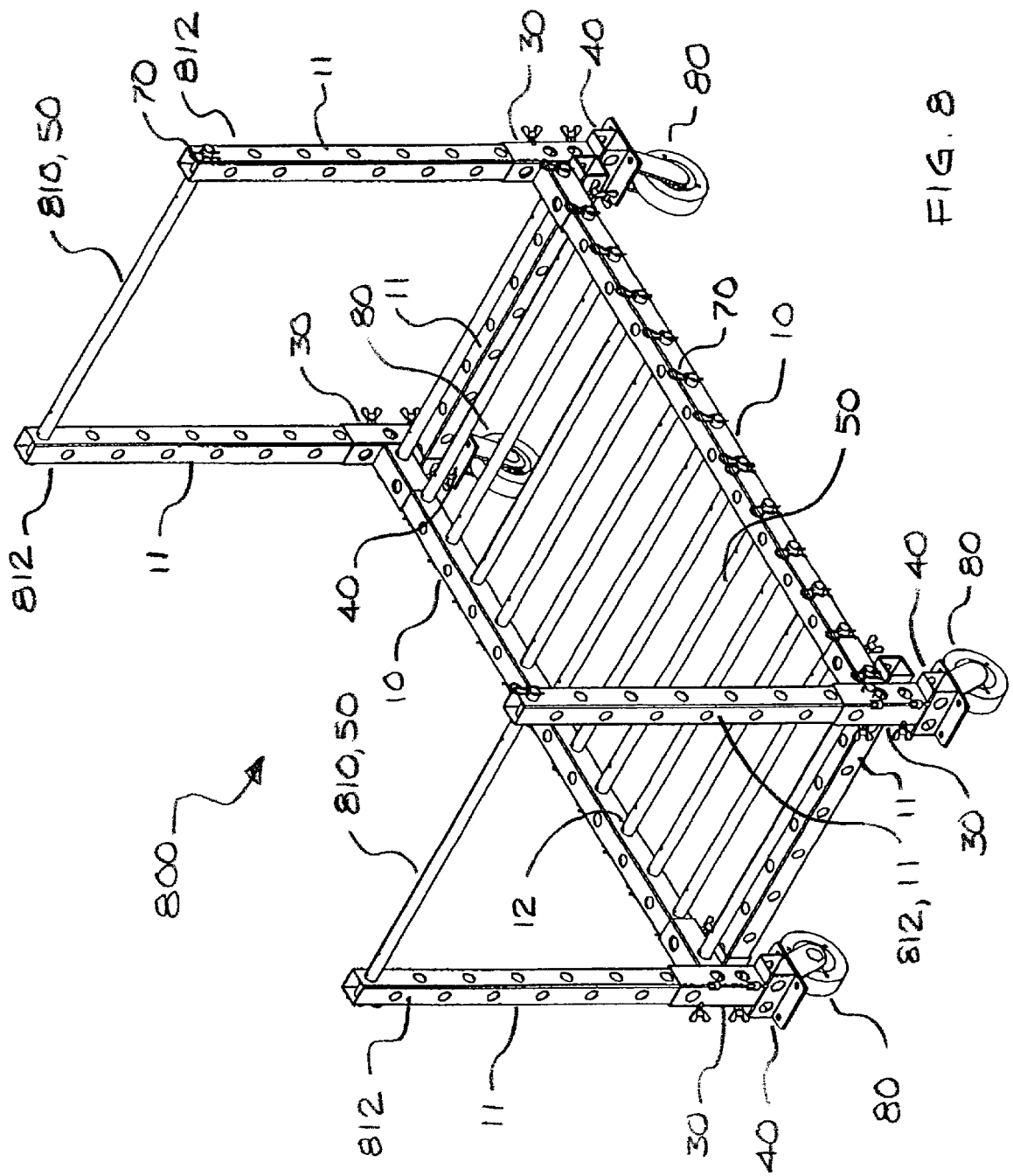
FIG. 8 is a perspective view of a second embodiment of a dolly that is assembled from a kit including the components shown in FIGS. 1(a)–1(j)

The various carts 500, 600, 800, 900 illustrated in FIGS. 5, 6, 8, and 9 all share a common basic frame construction. As best seen in FIG. 8, a rectangular base includes two long frame members 10, two short frame members 11, four three-way couplings 30, and four casters 80 and wheel adapters 40 connected as shown. A plurality of shelf tubes 50 may span the width of the frame and be supported in holes 12 in opposing frame members 10 as shown in FIGS. 5, 6, and 8. Shelf tubes 50 may be placed in all the holes 12 as shown in FIG. 8, or in only a portion of the holes 12 as shown in FIG. 5 or 6. More or less shelf tubes 50 may be used depending on the nature of objects to be supported on the resulting array of tubes. The shelf tubes are locked into the connected frame members 10 by locking pins 70 inserted through the cross holes 60 in the ends of the tubes 50. From this basic frame construction, various carts may be constructed.

The carts 500, 600 shown in FIGS. 5 and 6 include an array of vertical uprights 510, 610 comprised of vertically mounted shelf tubes 50. These carts are useful for verticals supporting substantially planar objects between the pairs of shelf tubes 50. A corner post 512, 612 is mounted on each corner and comprises a short or long frame member 10 or 11. The posts 512, 612 are mounted in the channels 36 of the couplings 30. The cart shown in FIG. 5 includes a platform 514 supported on the horizontal shelf tubes 50 on the frame. The cart 600 shown in FIG. 6 includes an additional set of shelf tubes 616, 50 mounted vertically along the center of the frame as shown. An additional long frame member 618, 10 is supported along the horizontal shelf tubes 50 to provide a mount for the central vertical shelf tubes 616.

The cart shown in FIG. 8 is a transport dolly 800 having two end handles 810. The handles comprise shelf tubes mounted between the corner posts 812 and locked in place by locking pins 70 as shown. The handles 810 can be used to push, pull or steer the dolly 800, and also may provide additional lateral support for objects supported on the dolly 800.

Figure 9:
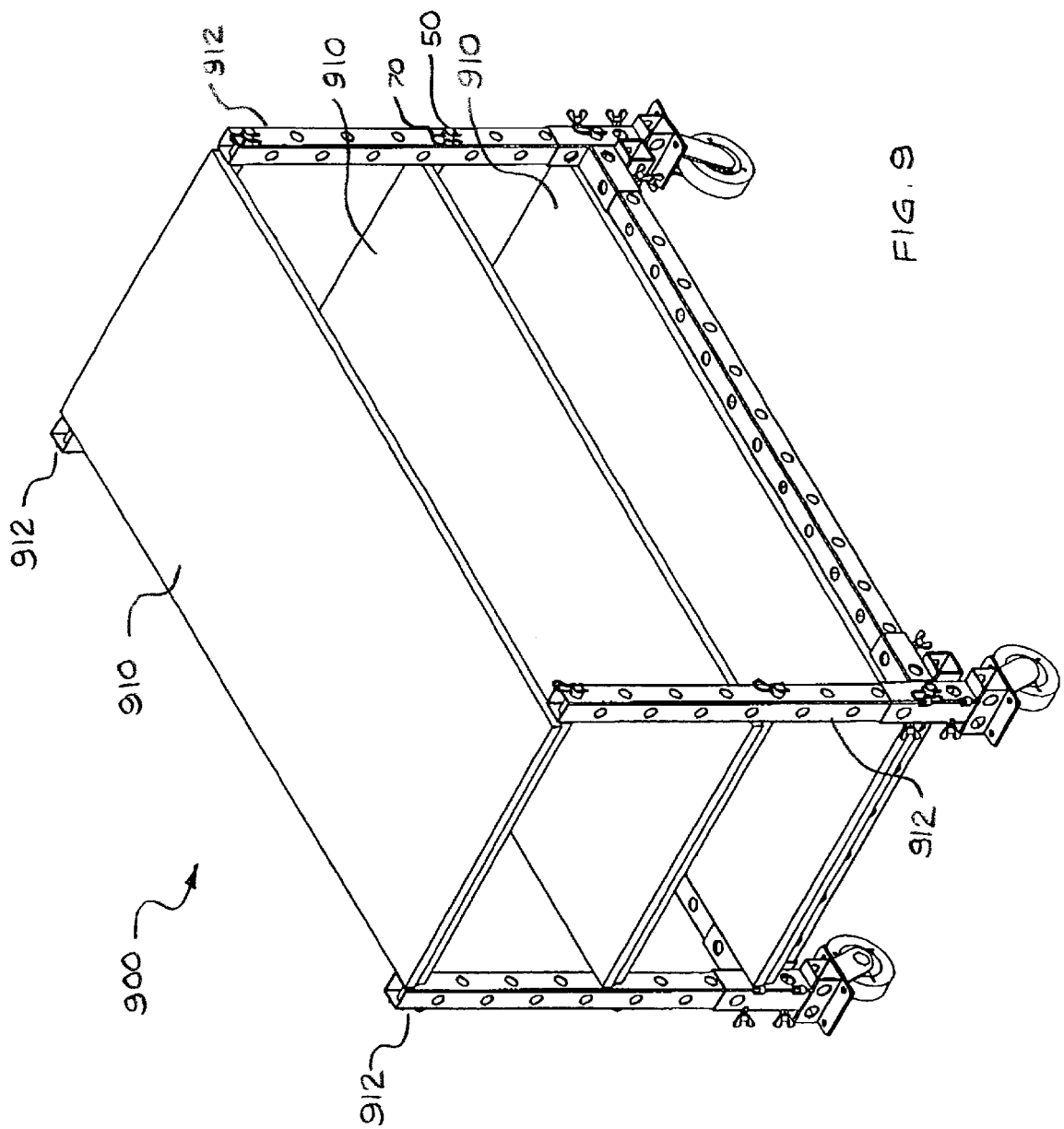
FIG. 9 is a perspective view of an embodiment of a cart having multiple shelves that is assembled from a kit including the components shown in FIGS. 1(a)–1(j)

The cart 900 illustrated in FIG. 9 includes a plurality of shelves 910 supported on shelf tubes 50 that are mounted between the corner posts 912 as shown. The shelf tubes 50 are locked into the frame members 10 or 11 that comprise the corner posts 912 with locking pins 70. The cart may include more or fewer shelves as desired.

Figure 10:
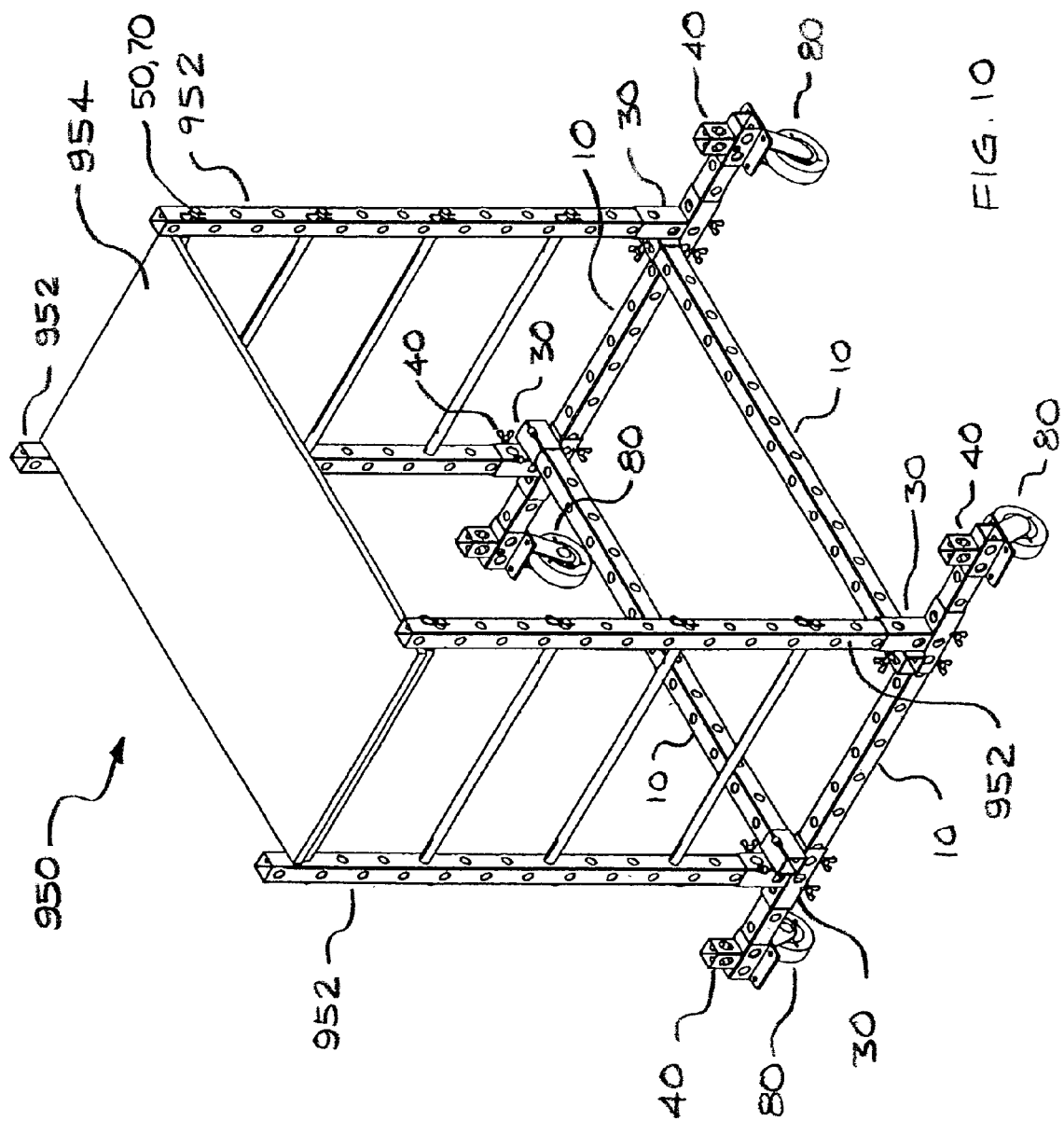
FIG. 10 is a perspective view of an embodiment of a cart having a raised upper shelf, the cart being assembled from a kit including the components shown in FIGS. 1(a)–1(j)

The cart 950 shown in FIG. 10 includes a different base construction than the carts described above. The rectangular base is constructed from four long frame members 10 assembled together as shown by four three-way couplings 30. The casters 80 are mounted to protruding ends of two of the frame members 10 by wheel adapters 40. Four long frame members 10 are mounted in the couplings 30 to form the corner posts 952. Pairs of shelf tubes 50 are assembled between the corner posts 952 to provide shelf supports and are locked in place with locking pins 70. One or more shelves 954 are supported on the pairs of shelf tubes 50. This construction provides a broader, more stable base for the taller cart.

A preferred kit includes an assortment of the aforementioned components as listed in the table below:

TABLE

| Component Description | Dwg. Ref. No. | Quantity |
|---|---|---|
| Long Frame member | 10 | 4 pcs. |
| Short Frame member | 11 | 6 pcs. |
| Union | 20 | 2 pcs. |
| Three-way Coupling | 30 | 4 pcs. |
| Wheel Adapter | 40 | 4 pcs. |
| Shelf Tube | 50 | 30 pcs. |
| Long Connector Tube | 60 | 4 pcs. |
| Short Connector Tube | 62 | 16 pcs. |
| Locking pin | 70 | 100 pcs. |
| Caster | 80 | 4 pcs. |
| Tube Sleeves | 90 | 120 pcs. |
| Set Screw | 100 | 36 pcs. |

I claim:

1. A kit for constructing a variety of easy-to-assemble portable storage and transportation carts comprising:

(a) a plurality of elongated hollow frame members having substantially uniform outer cross-sectional profiles, wherein each frame member includes a first and a second end, sidewalls, and at least one series of incrementally spaced pairs of aligned holes through opposite sidewalls of the frame member along the length thereof, where each pair of holes has an axis that is perpendicular to the sidewalls and passes through a longitudinal centerline of the frame member;

(b) a plurality of three-way couplings for connecting up to three frame members together at right angles to each other, each of said couplings comprising three hollow segments formed of a plurality of sidewalls and having an inner cross-sectional profile similar in shape to and slightly larger than the outer cross-sectional profiles of the frame members, at least one pair of sidewalls having at least one pair of aligned holes therein;

(c) a plurality of cylindrical shelf tubes having outer diameters slightly smaller than the diameters of the incrementally spaced holes in the sidewalls of the frame members such that the shelf tubes can be fittingly received in the holes in the side walls of the frame members, and means for retaining the shelf tubes within the holes in the side walls of the frame members;

(d) a plurality of casters, each caster including a mounting plate; and (e) a plurality of wheel adapters configured for mounting the casters to the frame members, each wheel adapter including a plate and an upstanding socket, the plate being suited for attachment to the mounting plate of a caster, and the upstanding socket having an outer profile the same as the outer profile of the frame members and at least one pair of opposed sidewalls having at least one pair of opposed and aligned holes therein;

wherein the frame members, three-way couplings, shelf tubes, casters, and wheel adapters or a portion thereof are configured and suited for non-permanent assembly together in a variety of combinations and configurations to form various portable utility and transportation carts.

2. A kit according to claim 1 further including a plurality of unions for connecting two frame members end-to-end, each union comprising a hollow body having a first end for mating engagement over an end of a first frame member, a second end for mating engagement over an end of a second frame member, and having a suitable cross-sectional shape and size to provide close, fitting engagement with the ends of the frame members.

3. A kit according to claim 2 wherein the plurality of frame members includes at least two different lengths of frame members.

4. The kit according to claim 2 wherein:

(a) the elongated hollow frame members have substantially uniform square cross-sections and include first and second pairs of opposing sidewalls, wherein each pair of opposing sidewalls includes a series of incrementally spaced pairs of aligned holes, the longitudinal positions of the aligned holes along one pair of opposing sidewalls being staggered from the longitudinal positions of the aligned holes along the other pair of opposing sidewalls; and (b) the three-way couplings, unions, and wheel adapters have square sidewalls for mating assembly with the square cross-sectional shape of the frame members.

5. The kit according to claim 4 wherein each three-way coupling, union, and wheel adapter includes aligned holes in opposed sidewalls which are suitably located and spaced for matching alignment with the incrementally spaced holes in the sidewalls of the frame members at assembly, where the matching holes may be used to connect a coupling, union, or wheel adapter to a frame member or each other.

6. The kit according to claim 5 further including a plurality of cylindrical connector tubes for connecting a frame member to a coupling, a union, a wheel adapter, or to another frame member, each connector tube having an outer diameter sized for fitting engagement in the incrementally spaced holes in the sidewalls of the frame members when aligned with the series of holes in the couplings, unions, and wheel adapters; and wherein the connector tubes include aligned cross holes adjacent to their ends for receiving locking pins to lock the connector tubes in place at assembly.

7. The kit according to claim 2 wherein each three-way coupling and union includes at least one transverse set screw for setting a frame member that is respectively engaged in the coupling or union.

8. The kit according to claim 1 wherein each three-way coupling comprises:

(a) a hollow vertical socket for mating engagement over an end of a first frame member;

(b) a hollow channel for fitting engagement over a second frame member; and (c) a hollow lateral socket for mating engagement with the end of a third frame member;

wherein the vertical socket, the lateral socket, and the channel are connected to each other and have longitudinal axes which are perpendicular to each other.

9. The kit according to claim 1 wherein the wheel adapters further include a horizontal channel for fitting engagement over a horizontally oriented frame member.

10. The kit according to claim 1 further including a plurality of plastic sleeves, each sleeve comprising a cylindrical body having a diameter that is slightly larger than the outer diameter of the shelf tubes and an axial slit in the body, wherein the sleeves can be mounted over the shelf tubes to provide discrete support points along the lengths of the shelf tubes.

11. An easy-to-assemble, easy-to-disassemble, and reconfigurable storage/transportation cart comprising:

(a) a plurality of elongated hollow frame members having substantially uniform outer cross-sectional profiles, wherein each frame member includes a first and a second end, sidewalls, and at least one series of incrementally spaced pairs of aligned holes through opposite sidewalls of the frame member along the length thereof, where each pair of holes has an axis that is perpendicular to the sidewalls and passes through a longitudinal centerline of the frame member;

(b) a plurality of three-way couplings for connecting up to three frame members together at right angles to each other, each of said couplings comprising three hollow segments formed of a plurality of sidewalls and having an inner cross-sectional profile similar in shape to and slightly larger than the outer cross-sectional profiles of the frame members, at least one pair of sidewalls having at least one pair of aligned holes therein;

(c) a plurality of cylindrical shelf tubes having outer diameters slightly smaller than the diameters of the incrementally spaced holes in the sidewalls of the frame members such that the shelf tubes can be fittingly received in the holes in the side walls of the frame members, and means for retaining the shelf tubes within the holes in the side walls of the frame members;

(d) a plurality of casters, each caster including a mounting plate; and (e) a plurality of wheel adapters configured for mounting the casters to the frame members, each wheel adapter including a plate and an upstanding socket, the plate being suited for attachment to the mounting plate of a caster, and the upstanding socket having an outer cross-sectional profile the same as the outer cross-sectional profile of the frame members, and at least one pair of opposed sidewalls having at least one pair of opposed and aligned holes therein;

wherein the frame members, three-way couplings, shelf tubes, casters and wheel adapters or a portion thereof are assembled together to form a portable storage and transportation cart.

12. A storage/transportation cart according to claim 11 wherein pairs of the shelf tubes are assembled in a cantilevered array on the cart such that each pair of shelf tubes delineates substantially horizontal support plane for supporting a substantially planar object.

13. The storage/transportation cart according to claim 12 further comprising a plurality of sleeves movably mounted on the cantilevered shelf tubes, the sleeves thereby providing adjustable support points on the shelf tubes for supporting substantially planar objects at discrete points on the shelf tubes.

14. The storage/transportation cart according to claim 12, wherein the cart comprises:
(a) a base including:
(i) a pair of foot rails, each foot rail comprising one of the frame members;
(ii) a cross rail comprising one of the frame members;
(ii) a pair of the three-way couplings; and
(iv) four of the casters; and
(v) four of the wheel adapters
wherein the cross rail has a first end connected to one foot rail by one three-way coupling and a second end connected to the other foot rail by the second three-way coupling such that the two foot rails are parallel to each other and the cross rail is perpendicular to each foot rail, and wherein the casters are mounted on the base at the ends of the foot rails by the wheel adapters;
(b) a pair of opposed vertical stanchions, each vertical stanchion comprising one of the frame members and having a top end and a bottom end, wherein each vertical stanchion is mounted to the base by one of the three-way couplings connecting the cross rail to the foot rails;
(c) a cross beam comprising:
(i) one of the frame members; and
(iii) a second pair of three-way couplings;
wherein each end of the cross rail is connected between the top ends of the vertical stanchions by use of the two three-way couplings; and
(d) a plurality of pairs of shelf tubes arranged in a cantilevered array on the vertical stanchions wherein the shelf tubes are engaged in the holes of the frame members comprising the vertical stanchions and are fixed in the frame members by locking pins such that each shelf tube is substantially parallel to the foot rails and each pair of shelf tubes delineates a substantially horizontal support plane for supporting a substantially planar object.

15. The storage/transportation cart according to claim 14 wherein the shelf tubes are cantilevered from a forward side of the vertical stanchions.

16. The storage/transportation cart according to claim 15 further including a pair of stanchion braces, each stanchion brace comprising a frame member connected at one end to a vertical stanchion and at a second end to a foot rail that is connected to the stanchion, where each stanchion and associated brace form an acute angle.

17. The storage/transportation cart according to claim 14 wherein the shelf tubes extend through the holes in the frame members comprising the vertical stanchions so that the shelf tubes extend through the vertical stanchions, such that first portions of the shelf tubes are cantilevered from a front side of the vertical stanchions and second portions of the shelf tubes are cantilevered from a back side of the vertical stanchions, thereby forming a front cantilevered array and a back cantilevered array of substantially horizontal support planes.

18. The storage/transportation cart according to claim 14 wherein each vertical stanchion further includes a second frame member and a union, wherein the first and second frame members are connected end-to-end by the union to make the cart taller.

19. The storage/transportation cart according to claim 11, the cart comprising:
(a) a rectangular base having a top, a bottom and four corners, the base comprising:
(i) four of the frame members;
(ii) four of the three-way couplings;
(iii) four of the casters; and
(iv) four of the wheel adapters;
wherein ends of the frame members are connected together by the three-way couplings to form a rectangle wherein each frame member forms a side of the rectangle and each three-way coupling forms a corner of the rectangle, and each caster is mounted on the bottom of the base, each caster being mounted to the base at each corner by a wheel adapter connected to a coupling;
(b) a vertical post mounted to the top of the base at each corner, each post comprising one of the frame members and being connected to the corner of the base by the three-way coupling at the respective corner of the base;
(c) a first plurality of the shelf tubes engaged at their ends in the holes of two opposing frame members forming the base and disposed between the two opposing frame members, where the shelf tubes are spaced and arranged to form a horizontal support surface; and
(d) a second plurality of the shelf tubes, the shelf tubes comprising pairs of shelf tubes, each pair of shelf tubes being vertically supported on the base to form a vertical support plane, the shelf tubes being supported in at least a portion of the holes in the sidewalls of the frame members comprising the base.

20. The storage/transportation cart according to claim 19 further including a platform supported on the first plurality of shelf tubes.

21. The storage/transportation cart according to claim 19 further including an additional one of the shelf tubes vertically mounted on the base between each pair of shelf tubes, where each additional shelf tube and its associated pair of shelf tubes combine to form a vertical support plane.

22. A storage/transportation cart according to claim 11, the cart comprising:
(a) a rectangular base having a top, a bottom and four corners, the base comprising:
(i) four of the frame members;
(ii) four of the three-way couplings;
(iii) four of the casters; and
(iv) four of the wheel adapters;
wherein ends of the frame members are connected together by the three-way couplings to form a rectangle wherein each frame member forms a side of the rectangle and each three-way coupling forms a corner of the rectangle, and each caster is mounted on the bottom of the base, each caster being mounted to the base at one of the corners by a wheel adapter connected to a coupling at the corner;

(b) a vertical post mounted to the top of the base at each corner, each post comprising one of the frame members and being connected to the corner of the base by the three-way coupling at the respective corner of the base;

(c) at least one pair of shelf supports comprising two of the shelf tubes, wherein the shelf tubes are supported between opposed pairs of vertical posts such that the shelf tubes are parallel to each other and combine to form a horizontal shelf support plane; and (d) a shelf supported on each pair of shelf supports.

23. A cart according to claim 11, the cart comprising:

(a) a rectangular base having a bottom and four corners, the base comprising:
  (i) four of the frame members; and
  (ii) four of the three-way couplings;
  wherein ends of the frame members are connected together by the three-way couplings to form a rectangle wherein each frame member forms a side of the rectangle and each three-way coupling forms a corner of the rectangle;

(b) four of the wheel adapters mounted on the bottom of the base, wherein each wheel adapter is mounted to a three-way coupling at a corner of the base; and (c) four of the casters mounted on the bottom of the base, wherein each caster is mounted to a wheel adapter at a corner of the base.

24. The cart according to claim 23 further comprising a plurality of the shelf tubes, where the shelf tubes are disposed in the holes in the sidewalls of two opposing frame members forming the base, and extend between the opposing frame members, thereby forming a horizontal support surface on the base.

25. The cart according to claim 24 further comprising:

(a) two opposing pairs of vertical corner posts, where each corner post comprises one of the frame members having a top end and a lower end, the lower end being connected to a corner of the base by a the three-way coupling at the corner; and (b) one of the shelf tubes connected between the top ends of each pair of corner posts thereby forming opposed handle bars for pushing, pulling, and steering the cart.

* * * * *